Oct. 30, 1956  R. E. SELTZER  2,768,574
AUTOMATIC BALER AND BANDING MECHANISM THEREFOR
Filed April 15, 1952  12 Sheets-Sheet 1
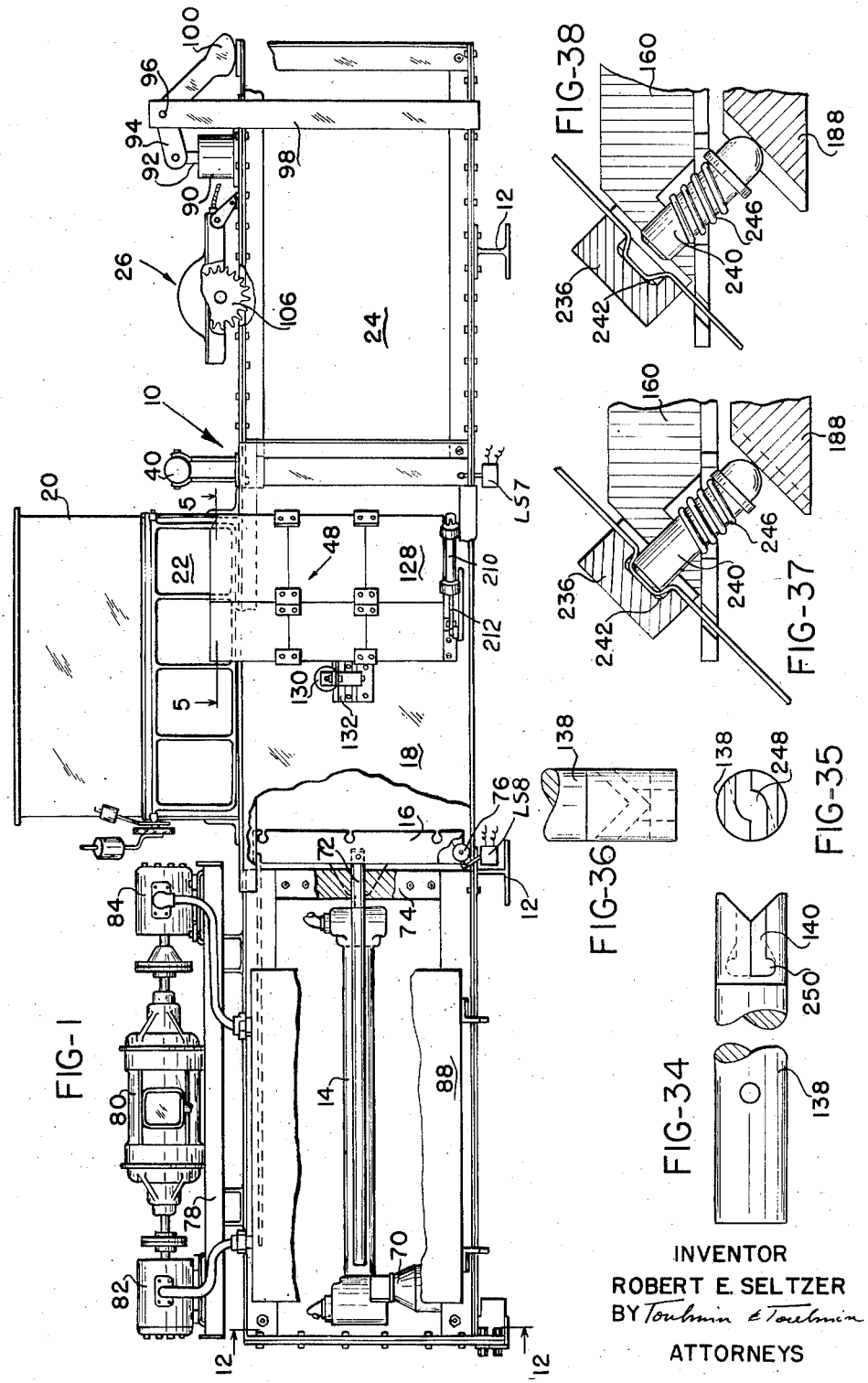
INVENTOR
ROBERT E. SELTZER
BY Toulmin & Toulmin
ATTORNEYS Oct. 30, 1956  R. E. SELTZER  2,768,574
AUTOMATIC BALER AND BANDING MECHANISM THEREFOR
Filed April 15, 1952  12 Sheets-Sheet 2
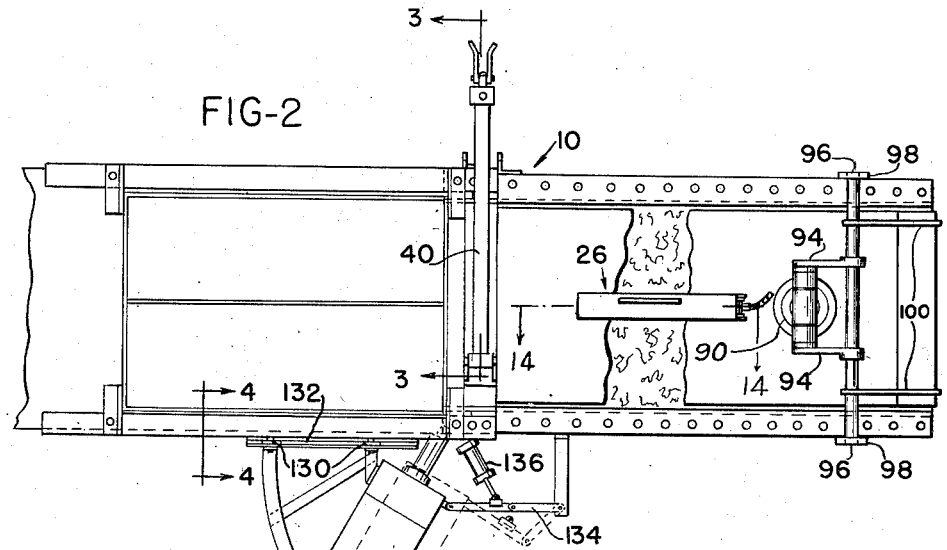
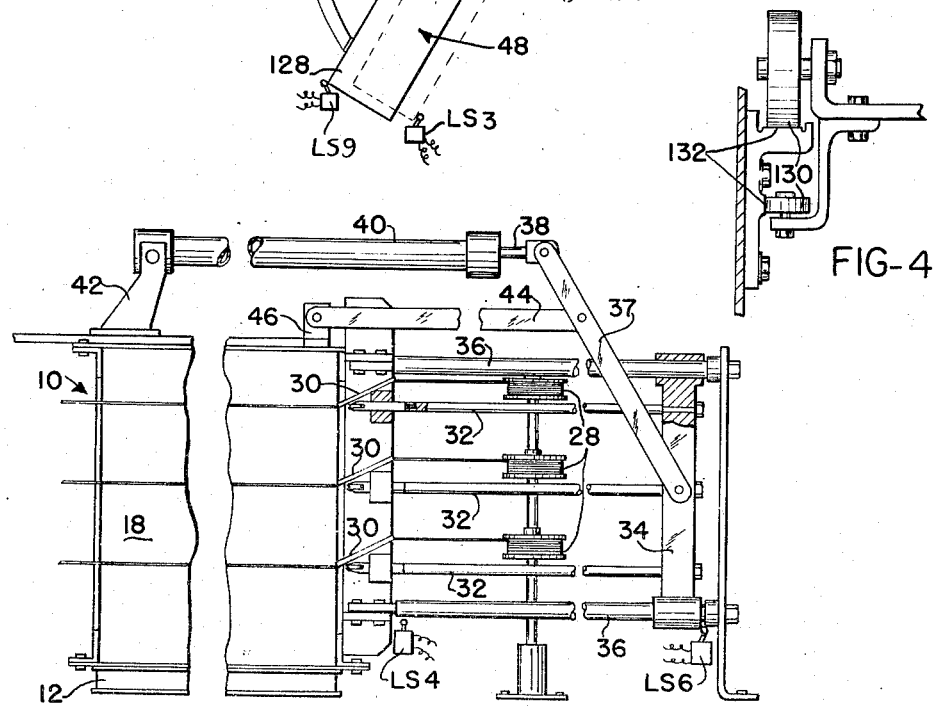
INVENTOR
ROBERT E. SELTZER
BY Toulmin & Toulmin
ATTORNEYS

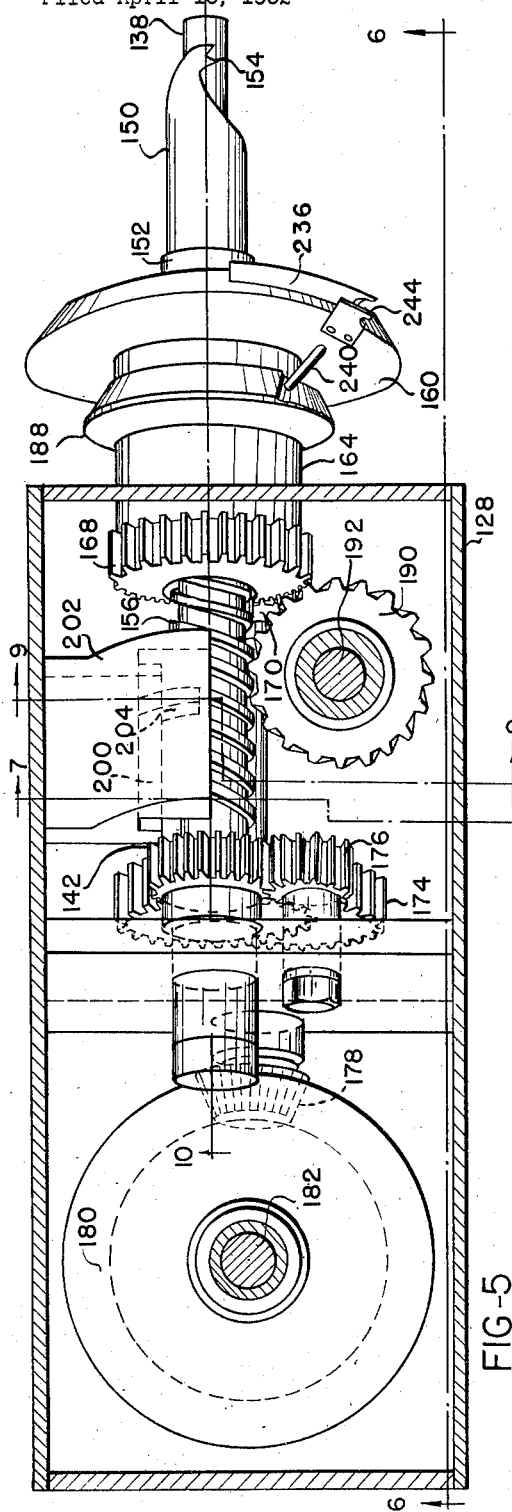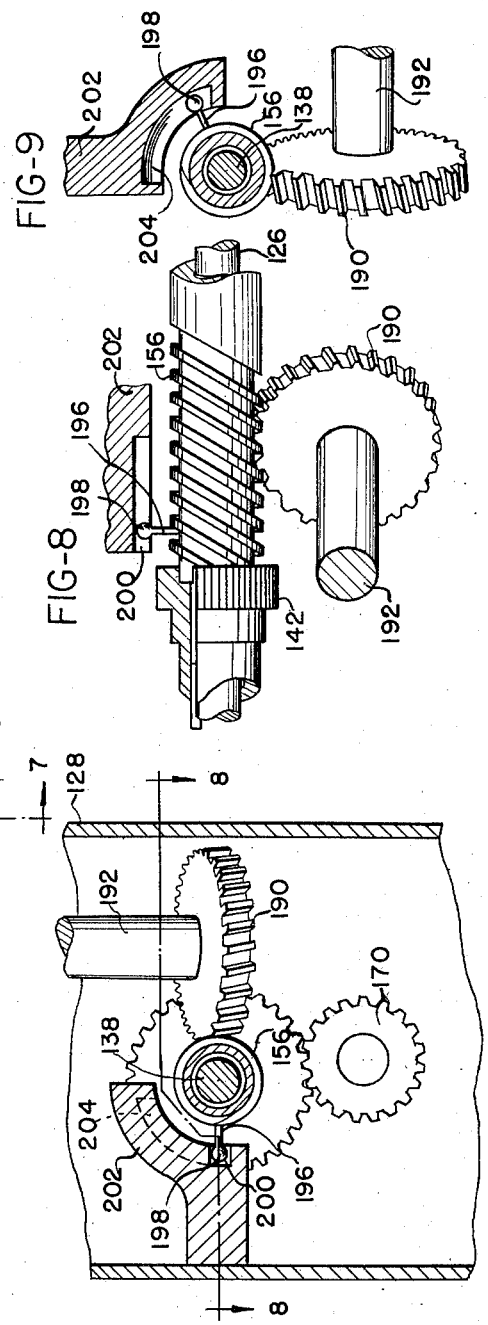

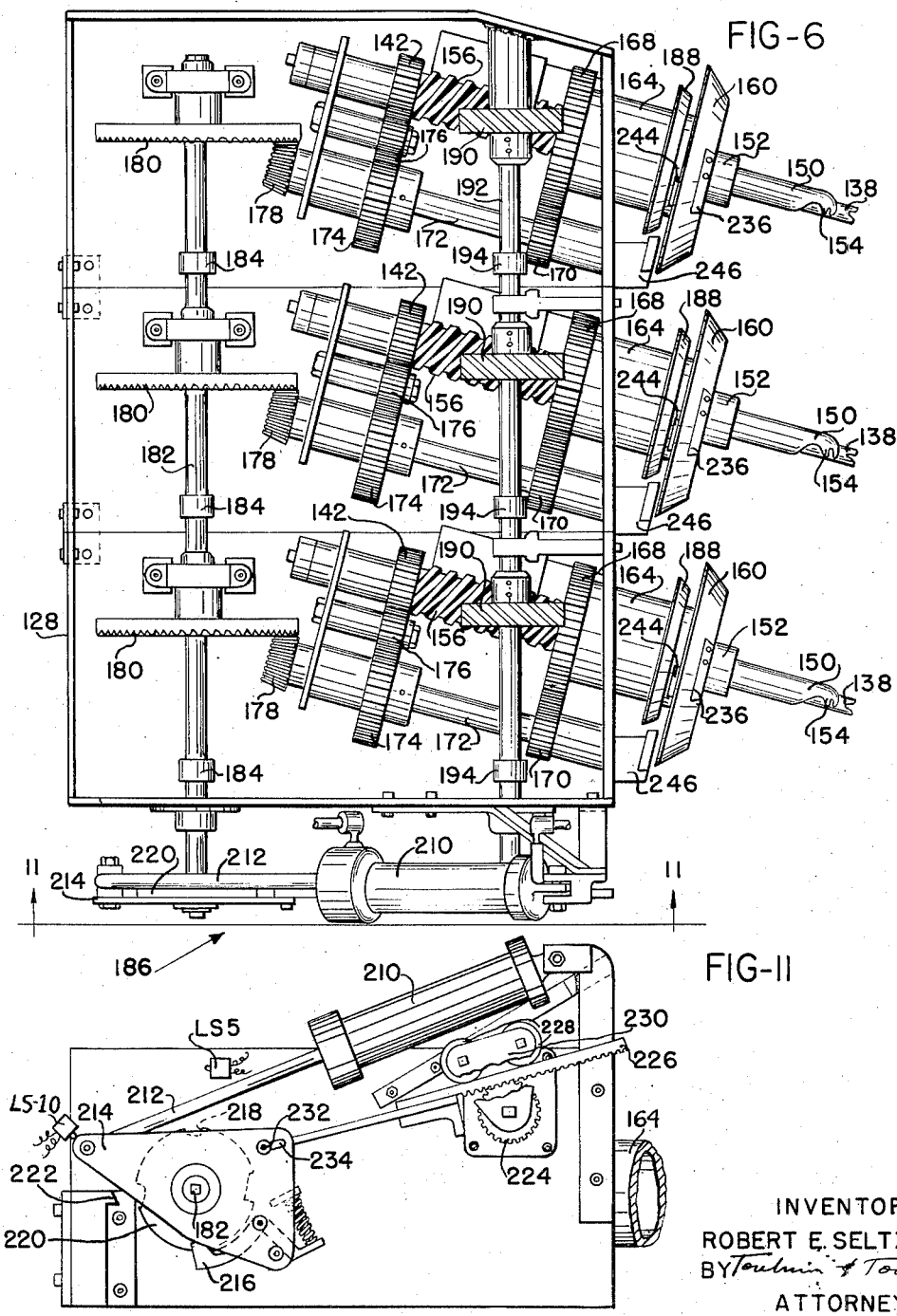

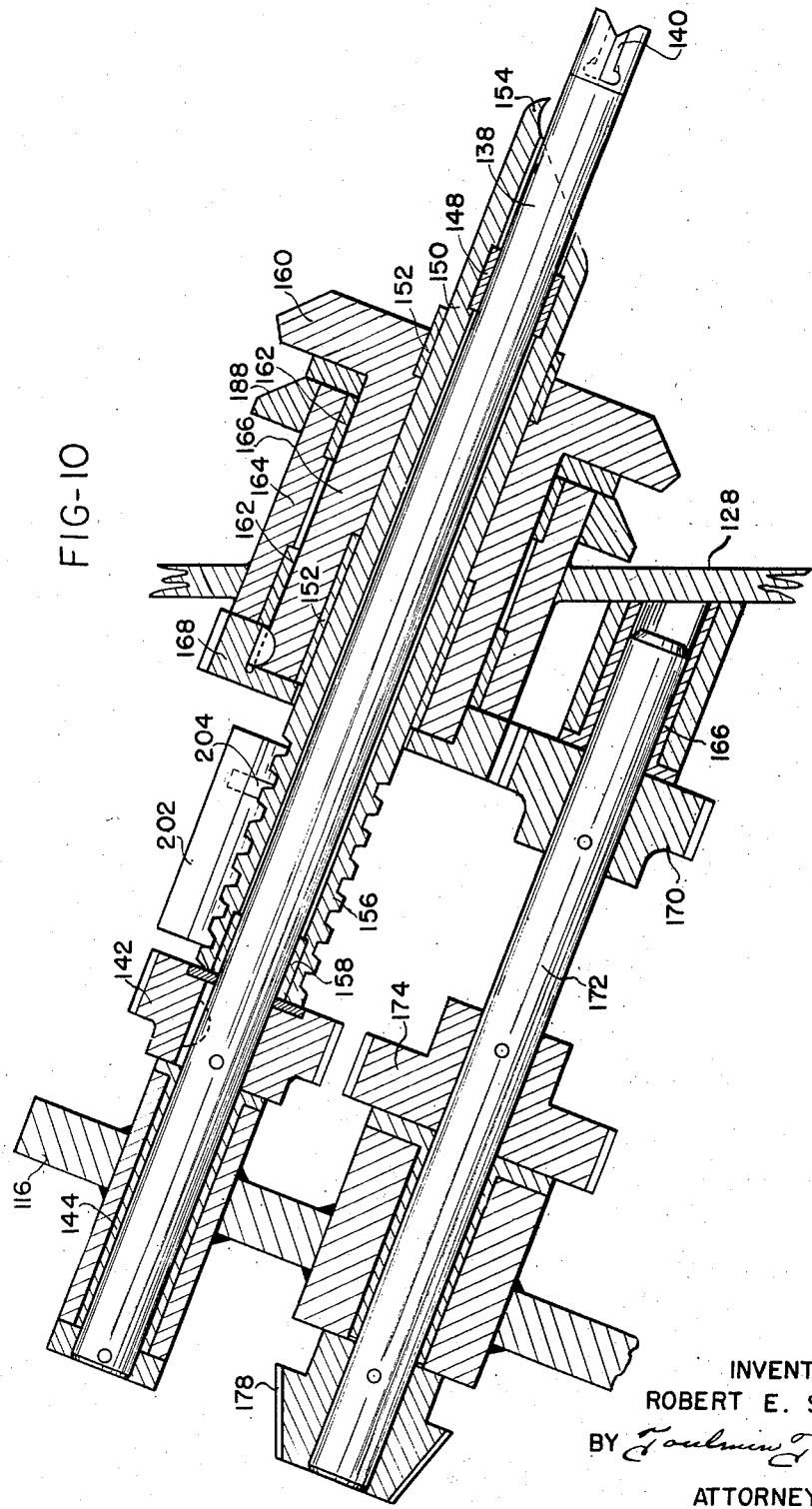

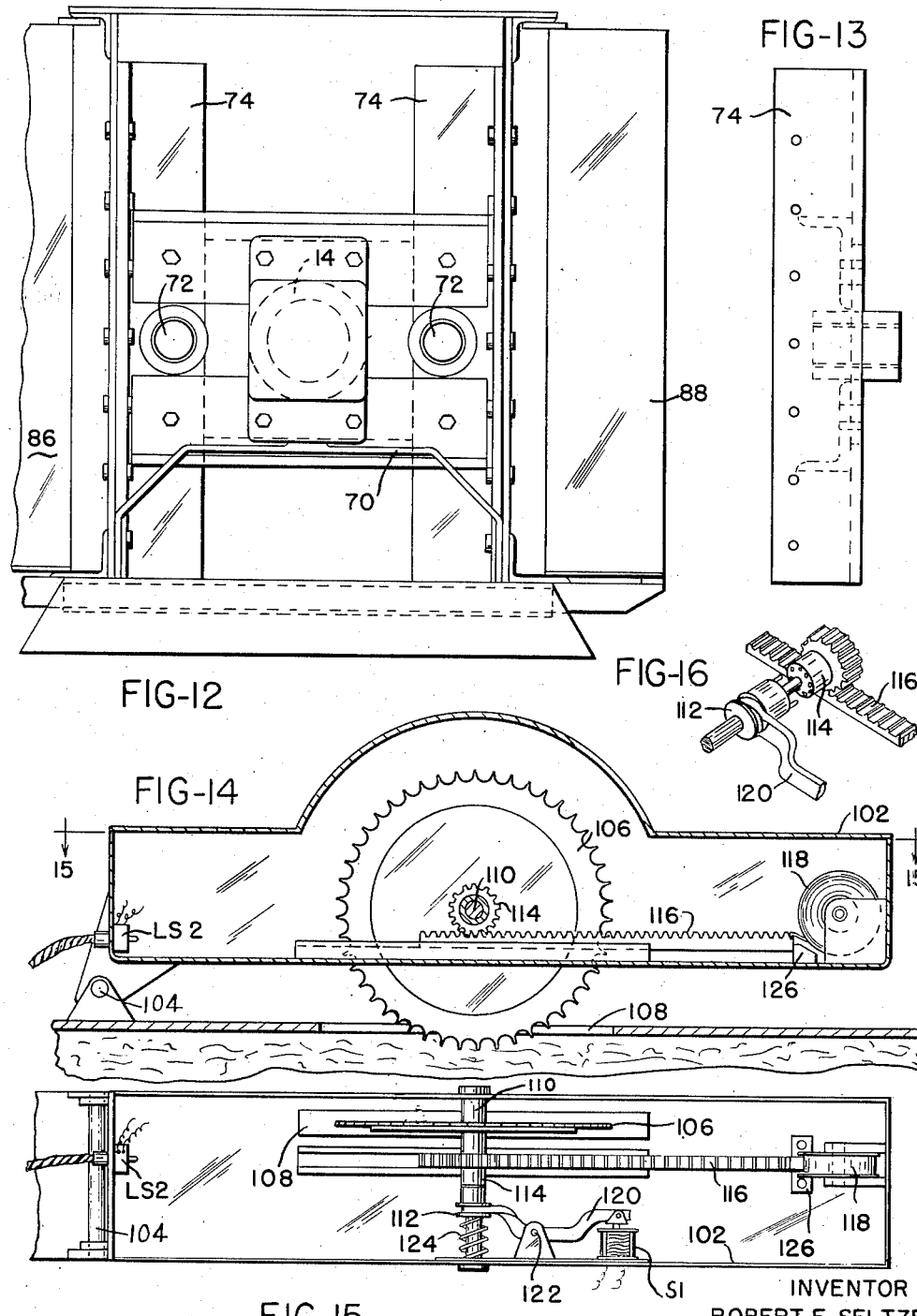

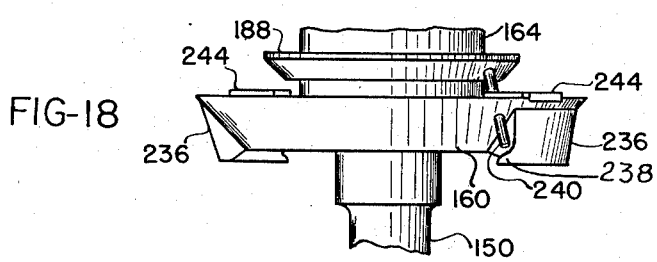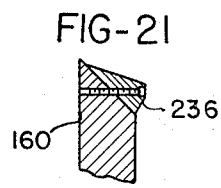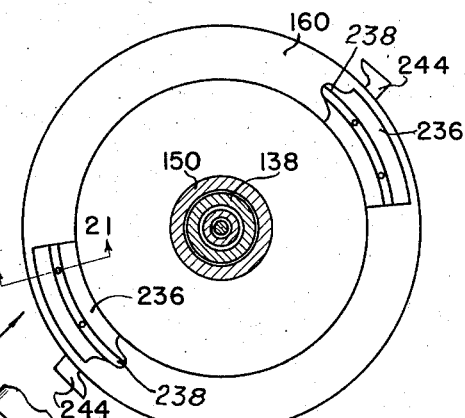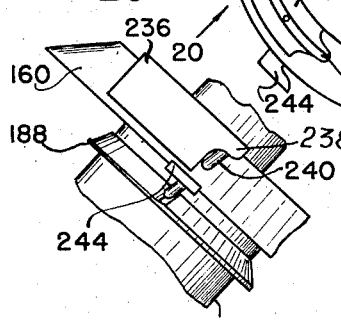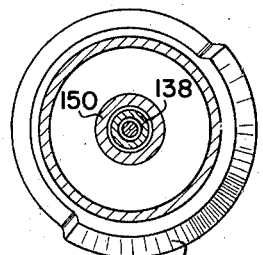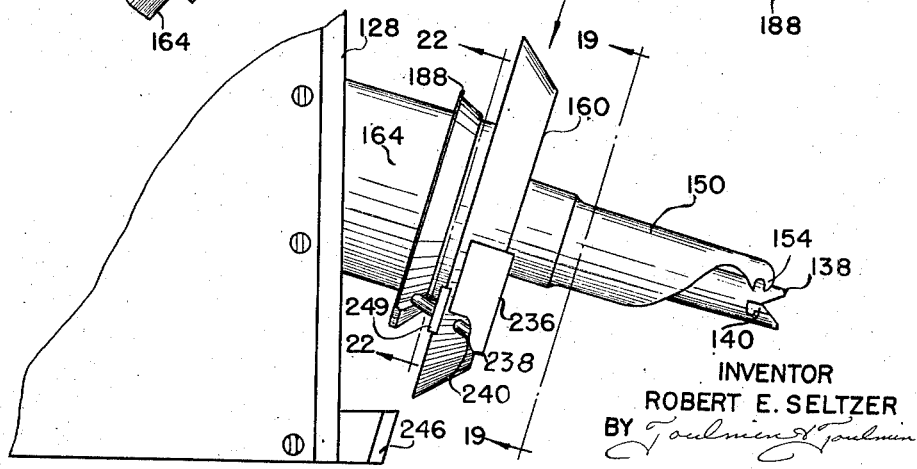

Oct. 30, 1956     R. E. SELTZER     2,768,574
AUTOMATIC BALER AND BANDING MECHANISM THEREFOR
Filed April 15, 1952     12 Sheets-Sheet 8
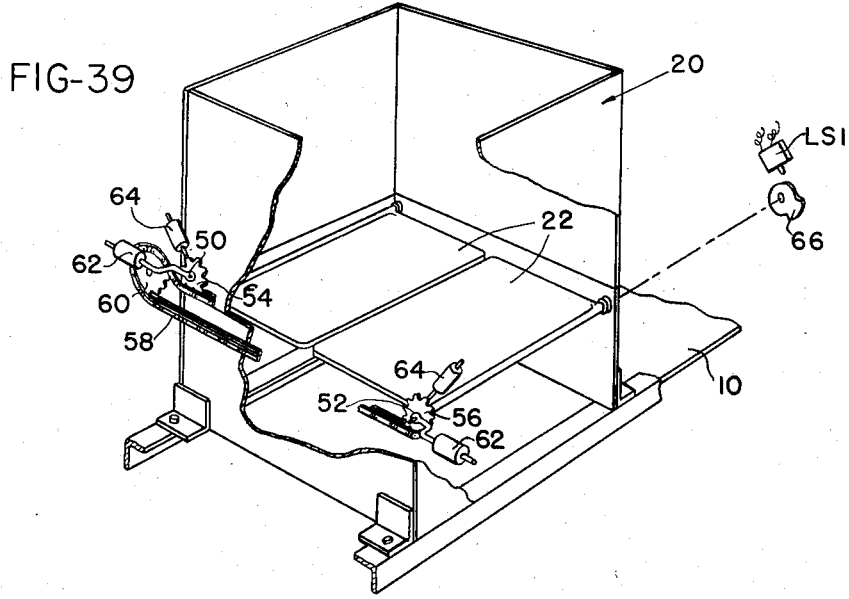
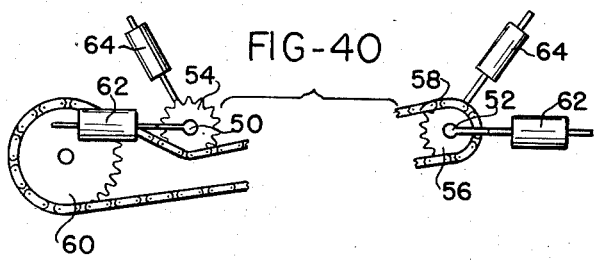
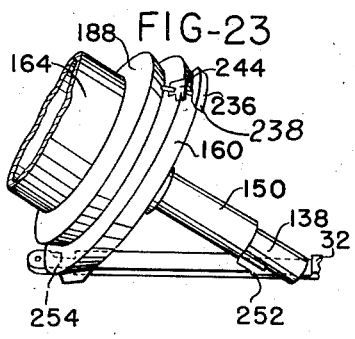 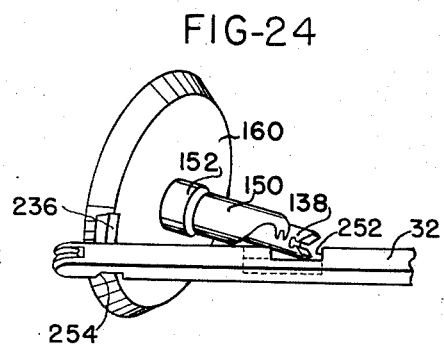
INVENTOR
ROBERT E. SELTZER
BY Toulmin & Toulmin
ATTORNEYS Oct. 30, 1956  R. E. SELTZER  2,768,574
AUTOMATIC BALER AND BANDING MECHANISM THEREFOR
Filed April 15, 1952  12 Sheets-Sheet 9
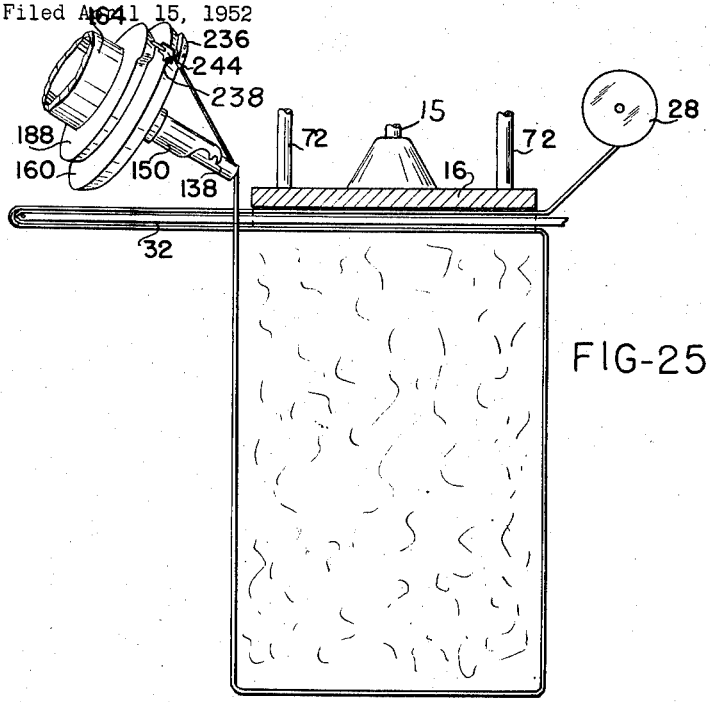
FIG-25
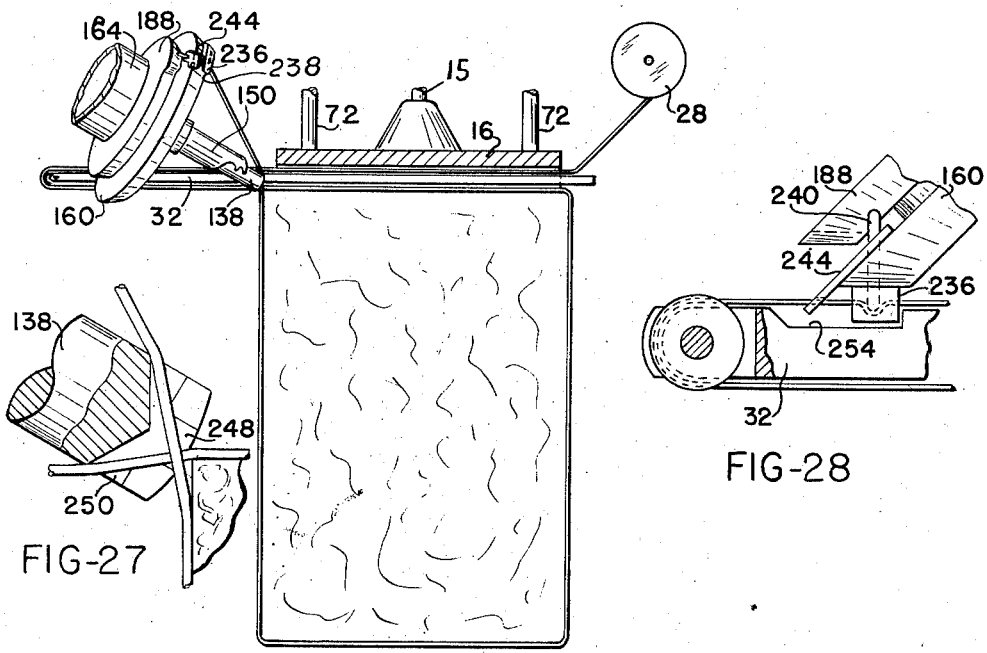
FIG-27
FIG-26
FIG-28
INVENTOR
ROBERT E. SELTZER
BY Toulmin & Toulmin
ATTORNEYS

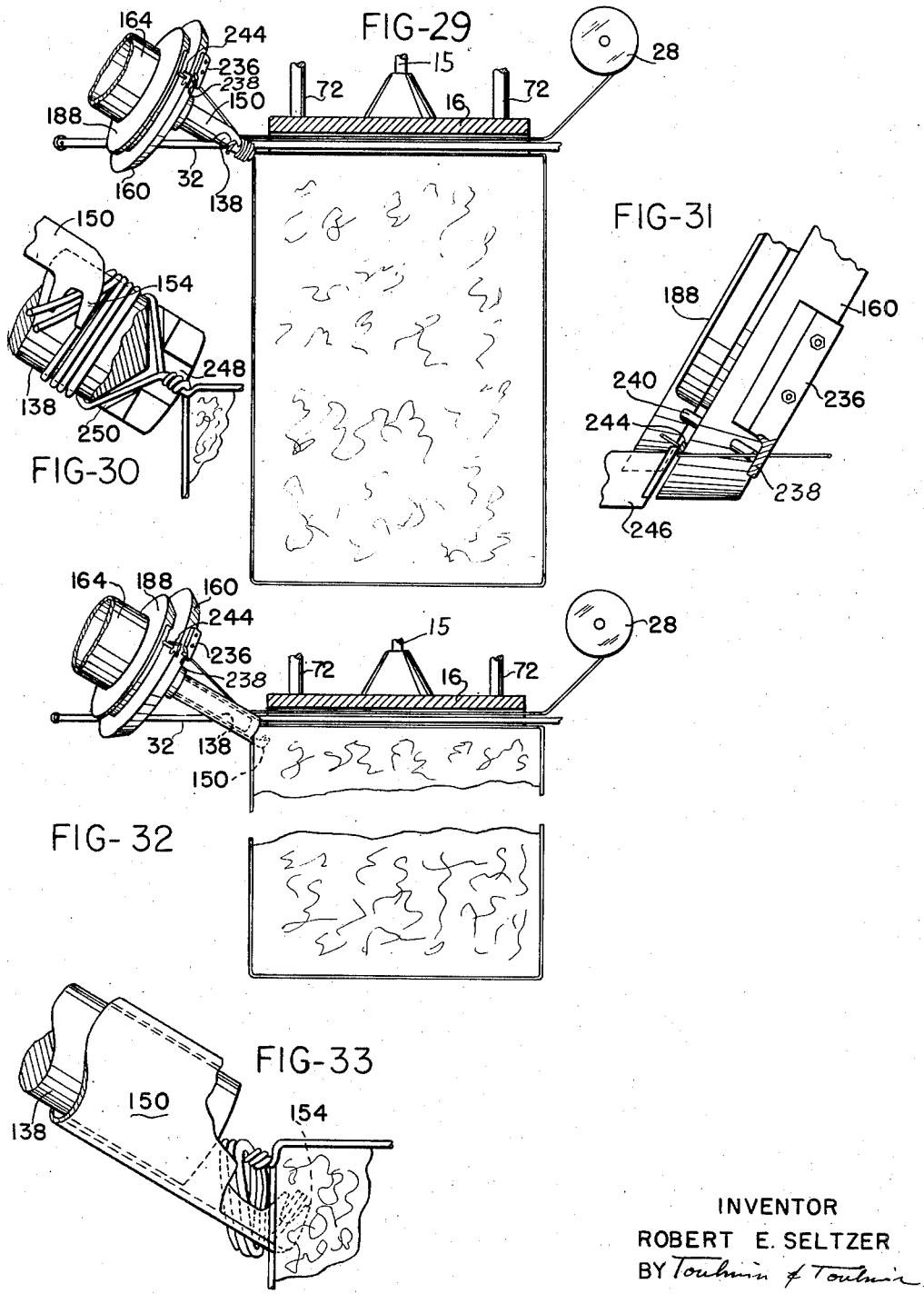

Oct. 30, 1956  R. E. SELTZER  2,768,574
AUTOMATIC BALER AND BANDING MECHANISM THEREFOR
Filed April 15, 1952  12 Sheets-Sheet 11
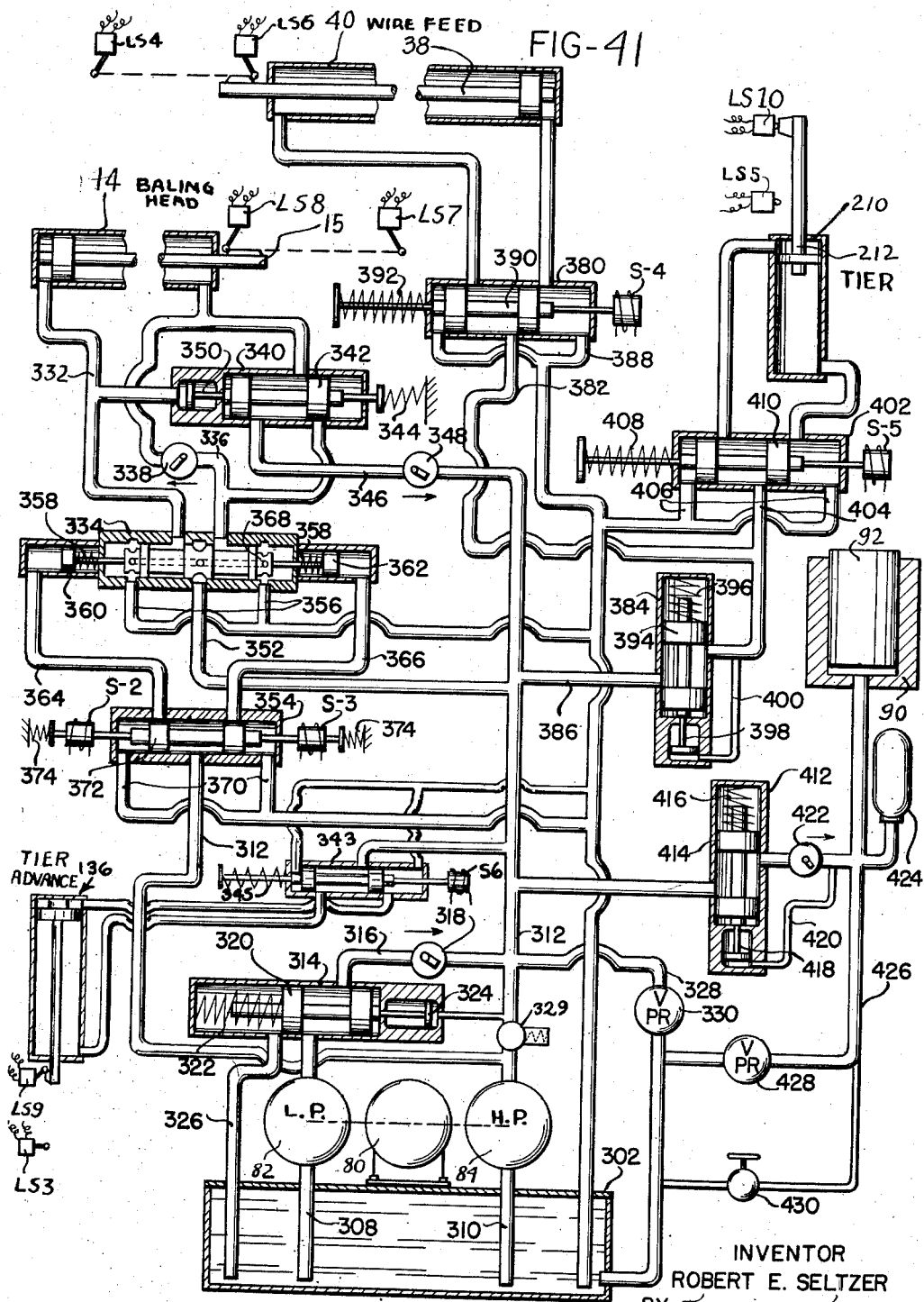
INVENTOR
ROBERT E. SELTZER
BY Toulmin & Toulmin
ATTORNEYS United States Patent Office 2,768,574
Patented Oct. 30, 1956

2,768,574

AUTOMATIC BALER AND BANDING MECHANISM THEREFOR

Robert E. Seltzer, Bellevue, Ohio, assignor to The American Baler Company, Bellevue, Ohio, a corporation of Ohio Application April 15, 1952, Serial No. 282,429

10 Claims. (Cl. 100—21)

This invention relates to baling machines and the like, and particularly to an automatic tier for tying banding wires.

Most baling devices will automatically form a bale to a predetermined size, but the banding of the bale and the tying of the cord or wires employed for banding has heretofore been accomplished manually. Carrying out this operation manually is not only somewhat slow but requires considerable labor, and, as a result, balers, particularly commercial balers for baling paper and industrial wastes, have never operated on as rapid and economical a cycle as was desired.

Having the foregoing in mind, the primary object of the present invention is to provide an automatic device for association with a baling machine which will automatically band the bales and tie or twist the banding wires, thereby eliminating the manual work which has heretofore been necessary.

Another object of this invention is the provision of a tying device that can be associated with a baler of substantially conventional manufacture.

A still further object of this invention is the provision of a device for twisting the wires with which a bale is banded so that while the wires are twisted tightly, there is no tendency for the wires to stick on the twisting device.

Another particular object of this invention is the provision of a device for twisting the wires with which a bale is banded which so twist the wires that no jagged ends are left projecting from the bale.

In connection with conventional baling machines the pressure under which the baling head operates is determined by fixedly restricting the opening through which the bales are forced at the exit end of the baling chamber. Such an arrangement has proved to be quite satisfactory for the baling of hay, straw, most rag materials, and the like, because they are relatively uniform in texture.

However, certain other materials which are baled, notably paper, do not possess the same uniform characteristics, and it has been found that bales of waste paper formed in this manner will tend to vary in density. It will be clear how this comes about when it is considered that together with loose individual sheets of paper there may be articles such as telephone books, and the like. The difference in characteristics of these materials is reflected in the varying density of the bales.

Accordingly, a still further object of this invention is to provide an arrangement whereby all of the bales manufactured by a baling machine are of substantially the same density.

A still further object is to provide an arrangement in a baling machine having a baling head where the baling head works under a substantially constant load, regardless of the characteristics of the material being baled.

It is also an object of this invention to provide a baler of the nature described and a control circuit therefore for integrating the operation of the several auxiliaries.

A further object of this invention is the provision in a baler of the nature described, of a wire banding and a tying arrangement wherein a plurality of wires can be wrapped around the bale and the ends thereof twisted and all of the wires being substantially uniform in tension.

Another object is the provision in a baler of an arrangement for producing bales of substantially uniform size, density, and weight.

Another object of this invention is the provision of a baling machine which is entirely automatic in operation but which is relatively simple in construction so that a minimum of maintenance is required to maintain the baler in operation.

Still a further object of this invention is the provision of a control circuit for a baler of the nature referred to in which, operation of the baler is integrated with the supply of material thereto, so that the baler does not carry out baling operations in the absence of an adequate supply of material to be baled.

These and other objects and advantages will be more apparent, upon reference to the following specification taken in connection with the accompanying drawings in which:

Figure 1 is a side elevational view of a baling machine constructed according to my invention and having associated therewith a wire twisting mechanism according to my invention;

Figure 2 is a plan view over the central part of the baling machine showing the position of the tying and twisting unit on the side of the machine;

Figure 3 is a transverse sectional view, indicated by line 3—3 on Figure 2, showing the general appearance of the mechanism which thrusts the banding wires across the back of the bale preparatory to tying;

Figure 4 is a sectional view, indicated by line 4—4 on Figure 2, showing the arrangement of the supporting rollers and tracks for the twisting and tying units;

Figure 5 is a sectional view, indicated by line 5—5 on Figure 1, showing the appearance of the twisting mechanism from above;

Figure 6 is a sectional view, indicated by line 6—6 on Figure 5, showing the internal construction of the twisting device;

Figure 7 is a sectional view, indicated by line 7—7 on Figure 5, showing a detail of the construction of the twisting device;

Figure 8 is a sectional view, indicated by line 8—8 on Figure 7;

Figure 9 is a sectional view, indicated by line 9—9 on Figure 5;

Figure 10 is a longitudinal section taken through one of the twister units, as indicated by line 10—10 on Figure 5;

Figure 11 is a view indicated by line 11—11 on Figure 6, and is a view looking up from beneath the twister unit showing the drive therefor;

Figure 12 is a view indicated by line 12—12 on Figure 1 looking in at the end of the motor that drives the baling head, and also showing the baling head;

Figure 13 is a side view of the cross head that guides the rods carried by the baling head;

Figure 14 is a sectional view; indicated by line 14—14 on Figure 2, showing a bale measuring device forming a part of this invention;

Figure 15 is a sectional view, indicated by line 15—15 on Figure 14, showing the arrangement of the bale measuring mechanism inside the housing thereof;

Figure 16 is a fragmentary perspective view showing a clutch forming a part of the bale measuring arrangement;

Figure 17 is a side view of one of the twister heads drawn at somewhat larger scale than Figure 6, but looking at the twister head in the same direction;

Figure 18 is a view looking in at the top of the transfer and cut-off plate forming a part of the twister head, looking in the direction of arrow 18 in Figure 17;

Figure 19 is a view looking in directly at the face of the cut-off and transfer plate, as indicated by line 19—19 on Figure 17;

Figure 20 is a view looking in at the side edge of the transfer and cut-off plate of Figure 19, as indicated by the arrow 20 on Figure 19;

Figure 21 is a fragmentary sectional view, indicated by line 21—21 on Figure 19;

Figure 22 is a view indicated by sectional line 22—22 on Figure 17, showing the configuration of a cam forming a part of the cut-off and transfer mechanism;

Figures 23 and 24 show top and side views, respectively, of the relationship that exists between the twister unit and the needle which thrusts the wire across the end of the bale after the needle has been pushed across the bale and the twister unit has moved into position to commence twisting;

Figure 25 is a diagrammatic plan sectional view showing the arrangement of the several parts of the mechanism immediately after the banding wire has been thrust across the back of the bale and before the twisting unit has moved to operative position;

Figure 26 is a view like Figure 25, which shows the twisting unit advanced to operative position;

Figure 27 is a fragmentary sectional view showing the manner in which the twister rod engages the two wires to be twisted together;

Figure 28 is a fragmentary sectional view showing how the wire is picked up from the needle by the cut-off and transfer plate;

Figure 29 is a view like Figures 25 and 26, but shows the wires twisted together by the twisting unit;

Figure 30 is a fragmentary sectional view like Figure 27, but shows the appearance of the wires in the end of the twister rod after being twisted;

Figure 31 is a view like Figure 28, but shows the wire which has been picked up by the cut-off and transfer plate in the moment it is cut off;

Figure 32 is a view similar to Figures 25, 26, and 29, but shows the position of the parts at the time the wire ends are being tucked up into the bale;

Figure 33 is a view similar to Figure 30, but showing the tucker advanced and tucking the ends of the wire into a corner of the bale;

Figure 34 is a side view showing the appearance of the end of the twister rod;

Figure 35 is an end view of the twister rod;

Figure 36 is a view of the twister rod looking down on top of Figure 35;

Figure 37 is a section showing the manner in which the wire is crimped and held in the transfer and cut-off plate with the parts in wire clamping position;

Figure 38 is a view similar to Figure 37, but showing the parts in wire releasing position;

Figure 39 is a perspective view showing the hopper arrangement for supplying material to the baler;

Figure 40 is a view showing the manner in which the hopper gates are controlled so that only a full charge of material can be delivered to the baling chamber;

Figure 41 shows the hydraulic operating circuit for the machine; and

Figure 42:
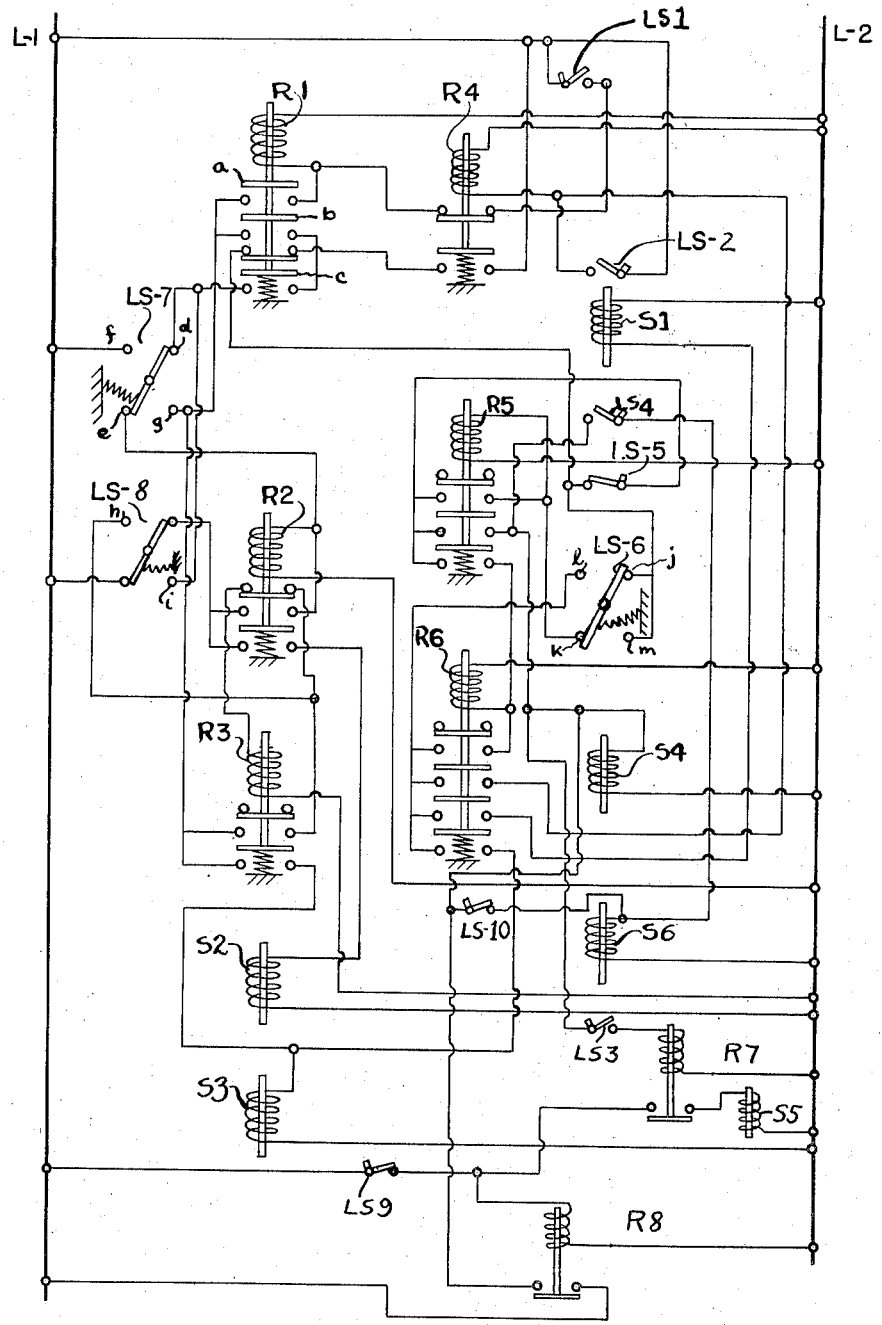

Figure 42 diagrammatically illustrates the electric control circuit for the machine.

*General arrangement*

A baling machine according to my invention comprises a generally horizontal frame in which is reciprocably mounted a baling head that is driven by a hydraulic motor. The baling head is reciprocable beneath a hopper extending vertically from the frame and through which the material to be baled is fed. The hopper comprises gates at the bottom which swing inwardly to close off the feed of material to the baling chamber, and which will open when there is a predetermined amount of material in the hopper above the gates, so that there is always a full charge of material supplied to the baling chamber.

The baling head is so controlled that it will only operate when there is a full charge of material in the baling chamber, and this prevents needless inspection of the baling chamber.

The compressed material is pushed through a rather elongated chamber in the usual manner, with resistance to movement of the material being accomplished by pressing opposite walls of the chamber toward each other. A measuring wheel bears on the material being pushed through this chamber, and at a predetermined length of bale, is operable to interrupt the baling cycle and to initiate a banding and tying cycle.

The banding of a bale according to my invention is accomplished by wires which are pushed across in front of the baling head, so that as a bale is built up thereby, the banding wires will extend around three sides of the bale. Thereafter, the wires are pushed across the back end of the bale and a novel cut-off and twister unit is operable to cut off the thrust across wire, to clamp the end of the wire leading to the supply wheel, to twist together the two ends of the wires passing about the bale, and to tuck the cut off ends of the wire into the corner of the bale.

At the completion of the banding cycle, the parts of the banding, twisting and cut-off mechanism retract to a rest position, and the machine then commences to build up a new bale.

*General constructional details*

The general construction of the machine will be seen in Figures 1, 2, and 3, and comprises a frame generally indicated at 10, which may be supported on a floor, as by the transverse beams 12. At the left end of frame 10 there is a hydraulic motor 14 adapted for reciprocating baling head 16 in a chamber 18. Chamber 18 is open at the top, and a feed chute or hopper 20 is provided for supplying material to chamber 18 ahead of baling head 16. Doors or gates 22 on the side of the hopper control the supply of material to chamber 18. The material so supplied to the chamber 18 is pushed therethrough by baling head 16 into a chamber 24, and in which the material is compressed and formed into a bale.

When a predetermined length of material has been compressed in chamber 24, as can be indicated by the bale measuring device 26, the baling cycle is interrupted with the baling head dwelling in its advanced position, and then wires are thrust across the back of the bale.

Figure 3 will reveal that there is positioned on one side of the machine a plurality of reels 28 for carrying baling wire, and that these wires lead through the tubes 30 into position to be picked up by needles 32 and thrust across the face of the baling head. Needles 32 are carried by a cross-head 34 guided on rods 36. Cross-head 34 is adapted for being driven by a lever 37 pivoted at one end to the cross-head and at its other end to ram 38 extending into cylinder 40 that has its closed end pivoted to a bracket 42 mounted on top of the baling machine. Lever 37 has an intermediate point pivoted to one end of rod 44 which has its other end pivoted to a bracket 46 carried by the baling machine.

After the wires have been thrust across the chamber, a cut-off and twister unit 48 becomes operable to cut off the wire, to grip the end thereof leading to the associated reel 28, to twist the ends of the wire together, and to tuck the cut off ends of the wire in the corner of the bale, and after which, all parts retract to a rest position and the baling again commences.

Material feed

Referring somewhat more in detail to the manner in which material is fed into the chamber ahead of the baling head and the control of the said feed, reference may be had to Figures 1, 2, 39 and 40.

The hopper or feed chute arrangement, generally indicated by reference numeral 20, has been indicated as having the gates 22 at the bottom thereof. As will be seen in Figures 39 and 40, the gates 22 are supported on shafts 50 and 52 that are journaled in the end walls of the hopper. Each of shafts 50 and 52 has thereon a sprocket, as at 54 and 56, and connecting the sprockets is a chain 58 that also passes around an idler 60. The arrangement of the chain is such that the gates will both swing downwardly and both swing upwardly at the same time.

Counterweights 62 are associated with shafts 50 and 52 to move with the gates, so that the gates will not open until a predetermined amount of material is resting thereon. Preferably, there are also provided other counterweights 64 which are so arranged that they pass over center as the gates open and actually assist in opening during the last part of their movement. The purpose of counterweights 64 is so that the gates will always open fully and will remain open until all of the material in the hopper or feed chute has been discharged therefrom.

One of the shafts for the gates mounts a cam 66 which cooperates with a limit switch LS1. Limit switch LS1 is normally open and is adapted for being closed when the gates move to their open position and for being held closed while the gates remain open, and this switch serves to control the operation of the baling machine so that the baling head remains idle whenever the gates are closed, and only operates when the gates open.

Baling mechanism

The baling mechanism has been identified as baling head 16, which is driven by hydraulic motor 14. Details in connection with the construction of the baling mechanism will be seen in Figures 1, 12, and 13. The motor 14, as will be seen in Figure 1, has its rear end supported on a bracket 70 in the machine, and at its other end, as explained, the ram connects with baling head 16. For the purpose of guiding baling head 16 in the machine and maintaining it in an upright position at all times, there is attached to the baling head a pair of guide rods 72 that extend rearwardly therefrom on opposite sides of hydraulic motor 14.

These guide rods extend through a stationary crosshead 74 which is provided with suitable bearings for receiving the rods. Cross-head 74 is firmly bolted in position in the frame of the machine, and by this construction the left end of the machine is made extremely strong and rigid.

At the same time the baling head is properly guided in all positions, and without the necessity of providing expensive guides within the chamber in which it moves.

Preferably, the baling head 16 comprises rollers 76 at the bottom which ride on the bottom wall of the chamber and thus support the baling head at all times and prevent the baling head from bearing with frictional engagement on the side walls of the chamber.

The left end of the baling machine is advantageously employed for supporting a platform 78 on which is mounted an hydraulic power unit for powering the baling machine. This unit comprises a motor 80 driving pumps 82 and 84, one of which is a high pressure low volume pump, and the other of which is a low pressure high volume pump.

Further, and as will be seen in Figures 1 and 12, fluid reservoirs or storage tanks 86 and 88 may be mounted on opposite sides of the baling machine at the left end, and by means of suitably arranged conduits, supply fluid to pumps 82 and 84 and receive the exhaust fluid returning from the various hydraulic motors operated thereby.

Density regulating mechanism

It has been mentioned that the motor being pushed through chamber 24 encounters a controlled resistance, whereby the density of the bale being made can be regulated by thrusting the top and bottom walls of chamber 24 toward each other, and this is brought about by the arrangement which will best be seen in Figures 1 and 2.

Mounted on the top wall of chamber 24 is a hydraulic cylinder 90 in which is mounted the plunger 92 adapted for being driven upwardly in cylinder 90 by a supply of pressure fluid thereto. The upper end of plunger 92 is pivoted to lever 94 which has an intermediate point pivoted at 96 to the upright members 98 that extend down opposite sides of chamber 24 and have their lower ends operatively secured to the lower wall of chamber 24.

The ends of levers 94 opposite their pivotal connection with plunger 92 bear on the upper wall of chamber 24, as at 100. It will be apparent that the supply of pressure fluid to cylinder 90 will bring about a downward thrust on the upper wall of chamber 24 and an upward thrust on the lower wall, which will serve to confine between those walls the bale being made, whereby a predetermined density in the bale will obtain.

It is understood, of course, that the top and bottom walls of chamber 24 are movable toward and away from each other, and, for this reason, it is to be preferred that the sides of this chamber be left open.

Bale measuring mechanism

The previously mentioned bale measuring mechanism designated in Figures 1 and 2 by reference numeral 26 is more fully illustrated in Figures 14, 15, and 16.

In these figures it will be seen that the bale measuring mechanism comprises a housing 102 pivoted at 104 to the upper wall of chamber 24, and that within the housing is a wheel 106 having a serrated periphery which extends through a slot 108 in the top wall of chamber 24 into engagement with the surface of the bale being pushed through the chamber, so that motion of the bale will also turn wheel 106.

Wheel 106 is carried on a shaft 110 journaled in the housing 102 of the unit, and slidably mounted on the shaft and keyed thereto is a clutch member 112. Clutch member 112 is adapted for engagement with a pinion 114 rotatable on shaft 110 so that when the clutch is engaged wheel 106 will drive pinion 114, and when the clutch is disengaged, the pinion is free to rotate on the shaft.

Pinion 114 meshes with rack 116 having spring means 118 in the form of a coiled ribbon or the like, which continuously urges the rack toward the right as it is viewed in Figures 14 and 15.

Solenoid S1 is connected with a clutch shifting arm 120 pivoted in housing 102 at 122 and engaged with clutch member 112 so that energization of the solenoid will bring about disengagement of clutch member 112 from pinion 114, while de-energization of solenoid S1 will permit spring 124 to move the clutch member into engagement with the pinion.

At the left-hand end of housing 102 preferably adjustably mounted therein, is a limit switch LS2 adapted for being closed by rack 116. The described arrangement operates generally in the following manner:

Clutch 112 is normally engaged with pinion 114 so that as a bale is built up in the chamber, wheel 106 is rotated thereby, pinion 114 is also rotated, and this drives rack 116 leftwardly. When rack 116 engages limit switch LS2, it indicates that a banding cycle should be initiated, and therefore the said limit switch is connected in circuit in a manner which will be described hereinafter, to interrupt the baling cycle and to initiate a banding and tying cycle.

At some time during the thus initiated banding and tying cycle, solenoid S1 will be energized to detach pinion 114 from wheel 106, and this will permit spring means 118 to return rack 116 against abutment 126, so that when baling is re-commenced, the bale measuring device is ready for a new measuring cycle.

Wire twisting unit

The wire twisting unit generally has been designated by numeral 48, and this unit in the machine illustrated in this application comprises three separate cut-off and twister units mounted in a single frame and commonly driven.

Each unit consists of a slotted rod which will be referred to as the twister rod, a sleeve reciprocable and rotatable on the rod and having a notched end part which is the tucker sleeve, and a rotatable cut-off and transfer plate which consists of means for severing the baling wire and for gripping the end thereof. The unit referred to is best illustrated in Figures 5 to 11, 17 through 24, and 34 through 38.

In these figures it will be observed that the twisting unit comprises a frame 128 which, as is most clearly illustrated in Figures 1 and 6, comprises three superimposed sections associated with each of which is a complete twister and cut-off unit. The arrangement of the twister unit in sections permits the use of as many thereof as may be necessary. In the machine illustrated in the drawings, three twister units are employed, but in other instances, more or fewer might be required and the sectionalized construction illustrated is important for this reason.

Frame 128 is provided with rollers 130, as will be seen in Figures 1, 2, and 4, which engage track means 132 mounted on the side of the frame of the baling machine, and this permits movement of the twister unit axially of the machine between its full line and dotted line positions in Figure 2.

For so moving the unit there is connected thereto the jointed arm 134 which has its other end connected to a point stationary with the frame of the baling machine. A hydraulic motor 136 is provided for breaking the arm to move the unit to its dotted line position, and similar movement can be employed for straightening the arm to move the unit back to its full line position.

Referring to the twisting mechanism proper associated with each section of the twisting units, reference may be had to Figures 5, 6, and 10, wherein it will be seen that each of the said sections comprises the central rod 138 having its end adjacent the baling machine slotted as at 140 and at its other end carrying a pinion 142. Means such as the bearings 144 and 148 rotatably support rod 138.

Surrounding rod 138 is a sleeve 150 reciprocable and rotatable in bearings 152 and having a projecting hook-like end part 154. Sleeve 150 is formed with an integral helical gear portion 156, and adjacent this portion is a bearing 158 between the sleeve and rod 138.

Rotatably mounted about sleeve 150 is a larger sleeve part 166 which is journaled in bearings 162 within a still larger sleeve member 165 that is rigidly mounted in the adjacent wall of frame 128. At its outer end sleeve part 166 carries the rotary cut-off and transfer plate 160 which is for the purpose of gripping the end of the baling wire and also for clipping the banding wire off during a tying operation. At its other end, sleeve part 166 carries a gear 168 which meshes with a gear 170 pinned to a shaft 172 that is journaled in frame 128. Shaft 172 also mounts a gear 174 that drives through an idler 176 into pinion 142 that is pinned to rod 138.

Shaft 172 carried at its extreme inner end a bevel gear 178 that meshes with a main driving bevel gear 180.

As will be seen in Figure 6, the bevel driving gears 180 of the three sections of the twister unit are mounted on a common vertical shaft 182 having couplings 184 for connecting the various sections of the unit together, and at its bottom end shaft 182 is adapted for being driven by a driving unit, generally indicated by numeral 186.

Returning to Figure 10, the outer end of stationary sleeve 164 for each section of the twister unit comprises a cam 188, the purpose of which is to actuate the wire gripping elements carried by the rotary cut-off and transfer plate adjacent thereto.

The helical gear portions 156 of the several tucker sleeves 150 are each engaged by a corresponding helical gear 190 arranged on a vertically extending drive shaft 192 provided with couplings 194 in the manner and for the reason already described in connection with shaft 182 and couplings 184 therefor. The extreme lower end of shaft 192 extends into the drive 186 at the bottom of the unit.

The previously mentioned helical gear 156 is availed of for giving the associated tucker sleeve first a reciprocatory and then a rotary movement by associating with the said helical gear a pin 196 having a head 198 that extends into a slot 200 cut longitudinally in a block 202 carried by frame 128. At the extreme right end of slot 200 there is a circumferentially extending slot portion 204, as illustrated in Figures 7 and 9. It will be apparent that rotation of the helical gears 190 will first cause axial movement of the associated sleeves 150 until the heads 198 of the pins 196 bottom at the right ends of slots 200, and thereafter further rotation of the helical gears 190 will cause rotation of the said sleeves with the heads of the said pins moving along the circumferential slots 204.

Drive mechanism for twister unit

The drive at the bottom of the twister unit is best illustrated in Figure 11, and will be seen to comprise a hydraulic cylinder 210 having a plunger 212 extending therefrom which is connected with a plate 214 rotatably mounted on the lower end of shaft 182. Plate 214 has pivoted thereto a pawl 216 adapted for engaging the notches 218 in the periphery of a cam plate 220 fixed on shaft 182. The pawl 216 is shaped to drive the cam plate positively in a clockwise direction in Figure 11 and to be impositive when moving counterclockwise.

As will be seen hereinafter, it is desirable after the twister rods have been driven in rotation to twist the wires together, to back the said rods up at least a slight amount to release the twisted wires therefrom, and for this reason there is provided a stationary cam or stop 222 adapted for engaging the arcuate back surface of pawl 216 at a predetermined point during its forward or clockwise motion, so that thereafter, when the drive is reversed, a predetermined amount of counterclockwise motion of the pawl and cam plate 220 will occur before pawl 216 moves out from beneath cam or stop 222 and releases the cam plate.

As will be more apparent hereinafter, it is desirable for the actuation of the twister rods to be in advance of the actuation of the tucker sleeves, and for this reason I provide means in the drive arrangement whereby the actuation of the tucker sleeves is delayed. This arrangement takes the following form:

The lower end of shaft 192 is provided with a gear 224 that meshes with a rack 226. The rack is held in engagement with the gear by rollers 228 carried on a plate 230 pivotally connected with the lower end of shaft 192. The rack is connected by means of a pin 232 and slot 234 with plate 214. Slot 234 is so located and extends in such a direction that plate 214 will move through a substantial angle in the clockwise direction before the rack will be picked up and moved to actuate the tucker sleeves. In this manner the twisting of the wires will commence before there is any actuation of the tucker sleeves.

As will be seen, the sleeve 160 is geared directly together with its associated twister rod and rotation of sleeve 160 and its connected cut-off and transfer plate will thus commence as soon as rotation of the associated twister rod commences.

Cut-off and transfer plate

Referring more in detail now to the mechanism for cutting off and gripping the wire, this mechanism is illustrated in Figures 5, 6, 17 through 24, 37 and 38. Each of the rotary cut-off and transfer plates 160 comprises a pair of diametrically opposite blocks 236 having their leading ends arranged with an extending part 238 that forms a notch or pocket for receiving the banding wire when the cut-off plate and transfer member is rotated.

The transfer plate and cut-off member is angularly bored in the region of the notches and formed by extending parts 238, and reciprocally mounted in the bores are the pins 240 having one of their ends bearing on the surface of the cam 188 and their other ends positioned adjacent the depression 242 in the adjacent of the blocks 236, as will be best seen in Figures 37 and 38.

Mounted on the cut-off plate in substantial alignment with each of the described notches are the shearing blades 244 that are so positioned that when member 160 is rotated the said blades will rotate closely by the stationary shearing blades 246 carried by the frame 128 of the twister unit. In this manner, the wire picked up in the notch formed by the block 236 will be sheared off.

As will be seen in Figure 22, the cam 188 is so arranged that the pins actuated thereby are in wire gripping position somewhat less than 180° of revolution of the cut-off and transfer plate 160 and are in wire releasing position during the remainder of the rotation of the plates. As will be seen in Figures 37 and 38, each of the pins 240 has associated therewith a spring 246 that continuously urges it toward wire releasing position.

Each of the twister rods preferably has its notched end formed as is illustrated in Figures 34, 35, and 36. The notch 140 in the end of the twister rod is formed by drilling the rod axially, and then milling along the length of the rod on opposite sides of the drilled hole with parallel slots that are also on opposite sides of the transverse centerline of the rod. At the bottoms of these last-mentioned milled slots, a V-shaped configuration is formed by drilling inwardly toward the axis of the rod along line inclined about 45° toward the outer end thereof. The arrangement is such that when a pair of crossed wires are received in the notched end of the twister rod and then twisted, the enlarged central part 248 receives the twisted together part of the wires, while the undercut parts 250 tend to receive and retain the projecting ends of the wires. The wires thus have little tendency to slip out of the notch in the end of the twister rod once the twisting has commenced.

It has previously been mentioned that the banding mechanism comprises the three rods or needles 32 carrying at their ends rollers for engagement with the banding wires. The manner in which the rods or needles 32 are constructed and cooperate with the twister rod and rotary cut-off and transfer plate will be seen in Figures 23 and 24. In these views it will be seen that the needle 32 is provided with a notch 252 for receiving the end of the twister rod after the needle has been thrust across the back of a bale and the twister unit then moved lengthwise of the machine to bring the twister rods into operative position.

Similarly, the end of needle 32 adjacent the periphery of the rotary transfer and cut-off plate 160 is provided with a notch 254 into which at least the block 236 and adjacent shearing blade 244 on the cut-off and transfer plate can extend thereby to pick up the wire from the needle when the cut-off and transfer plate is rotated.

*Banding operation*

Assuming a bale has been built up in the machine to the desired size, it is then desired to thrust the wires across the back of the built-up bale. As soon as the bale has reached the required size, the baling head will come to rest in its fully advanced position and motor 40 will then be actuated to drive needles 32 across the back end of the bale and at the face of the baling head. This position of the parts is illustrated in Figure 25.

Thereafter, the motor 136 is actuated to move the twisting unit 48 lengthwise of the machine to bring the notched ends of the twister rods into engagement with the wire passing around the bale at the point where the wire crosses itself. This position of the parts is illustrated in Figures 26 and 27.

Thereafter the drive for the twister unit will be actuated, which will bring about rotation of the twister rods to twist the ends of the wire together, and at the same time, will drive the rotary cut-off and transfer plates to pick up the wires from the needles to grip the wires and also to shear off the wires.

At the moment of picking up the wires in this manner, each rotary cut-off plate will occupy the position relative to the needle illustrated in Figure 28. The position of the parts generally at this time in the cycle is illustrated in Figure 26, while Figure 30 illustrates the wires after they have been twisted by the twister rod and Figure 31 illustrates the wire in the act of being cut off.

After the wire has been cut off and twisted the tucker sleeve advances and tucks the raw ends of the wire into the corner of the bale. This is illustrated in Figures 32 and 33, and thereafter, the twister unit moves back into its original position, the needles retract backwardly across the chamber, and a new baling cycle can be commenced.

*Hydraulic control circuit*

The hydraulic control circuit for controlling the operation of the baler and the banding and tying mechanism is illustrated in Figure 41. This view shows motor 80 connected to drive the two pumps 82 and 84 which have suction conduits 308 and 310 respectively, extending into a tank or reservoir. Pump 82 is a low pressure-high volume pump, whereas pump 84 is a high pressure-low volume pump. Pump 84 delivers into a conduit 312, and pump 82 delivers into one port of a by-pass valve having a valve body 314. A conduit including a check valve 318 connects another port of the valve with conduit 312. Mounted within the valve body is a valve member 320 normally biased by spring 322 to interconnect the discharge side of the pump 82 with conduit 316.

A pilot cylinder and plunger 324 for the valve are connected with conduit 312, so that at a predetermined pressure in conduit 312 valve member 320 will shift so as to connect the discharge side of pump 82 with by-pass conduit 326 leading back to reservoir or tank 302. By this arrangement, pump 82 is completely unloaded at a predetermined pressure in conduit 312, and thereafter runs light until the pressure in the system drops to such a point that pump 82 can be of use in providing hydraulic power thereto.

Conduit 312 may be provided with a by-pass line 328 comprising a relief valve 330 for the purpose of relieving conduit 312 of excessive pressure, should it become necessary.

Conduit 312 also has a valve 329 that maintains a minimum pressure at the outlet side of pump 84 at all times.

The motor 14 pertaining to the baling head 16 is connected into the hydraulic circuit through a series of valves which provide for a plurality of speeds of operation of the plunger 15 of the motor. The advancing side of plunger 15 is connected by a conduit 332 with one of the service ports of a four-way valve 334. The other service port of this valve is connected by conduit 336 leading through a check valve 338 opening toward the motor to the retracting side of plunger 15.

Arranged in by-passing relation to check valve 338, is a valve 340 having a reciprocable valve member 342 normally urged by a spring 334 into position to interrupt the by-pass around check valve 338, and instead, to establish a connection between conduit 336 on the outlet side of check valve 338 and a conduit 346 leading through a check valve 348 to conduit 312. Valve member 342 is adapted for being shifted into position to establish the by-pass around check valve 338 by a pilot cylinder and plunger arrangement 350 connected to receive actuating fluid from conduit 332.

Valve 334 comprises a pressure inlet supplied by conduit 352 which leads to conduit 312 from which it receives pressure fluid.

Valve 334 also has exhaust connections at 356 which lead back to tank 302 and has a valve member 368, normally centered by means of centering springs 358 and adapted for being shifted into its two end positions by the pilot plungers 360 and 362 connected by conduits 364 and 366, respectively, with the service ports of valve 354.

Valve 334 is of the open center type, which is an arrangement wherein the valve member 368 of the valve, when in its normally centered position, provides free passage for fluid from the pressure conduit 352 to the exhaust conduits 356 and blocks the conduits 332 and 336, thereby preventing motion of the plunger.

Valve 354 also has exhaust conduit means at 370, and likewise comprises a valve member 372 normally centered by centering springs 374 and adapted for being shifted into its opposite end positions by energization of one or the other of solenoids S2 or S3, associated therewith. Valve 354 is of the closed center type, and when valve member 372 is in its normally centered position, a channel is established from the inlet of the valve to the exhaust. Valve 354 receives pressure fluid directly from pump 84 via conduit 355 which leads to the pump side of valve 329.

Cylinder 40 of the banding device has its opposite ends connected to the service ports of a valve 380 having a valve member 390, a conduit 382 supplies pressure fluid to the valve and the valve member is normally urged into position to retract plunger 38 by a spring 392, whereas energization of a solenoid S4 is adapted for shifting the valve member into its other position, to bring about advancing movement of plunger 38.

Reducing valve 384 is arranged to supply fluid to valve 380 and has a valve member 394 which is normally urged by a spring 396 into a position to afford free communication between the inlet and outlet of the reducing valve.

However, a pilot cylinder and plunger 398 are provided which are connected by the pilot conduit 400 with the discharge side of the reducing valve so that at a predetermined discharge pressure the valve member is moved upwardly to restrict communication between the said inlet and outlet, thereby to regulate the pressure at the discharge side of the reducing valve. In this manner a substantially constant pressure supply of fluid is provided for the operation of plunger 38 in cylinder 40 of Figure 3.

Furthermore, in this manner, operation of plunger 38 does not operate to reduce to any substantial degree, the pressure acting on the plunger 15, pertaining to the baling head.

The plunger 212 and cylinder 210 are similarly arranged with the opposite ends of the said cylinder connected to the service ports of a four-way valve 402, having an inlet port connected by conduit 404 with the outlet side of reducing valve 384. Valve 402, also comprises exhaust connections 406 leading back to reservoir 302. A spring 408 normally holds valve member 410 of valve 402 in position to supply pressure fluid from conduit 404 to the retracting side of plunger 212. However, energization of a solenoid S5 is effective for shifting the valve member to bring about a supply of pressure fluid to the advancing side of the said plunger thereby to cause an advancing movement thereof.

Cylinder 90 and plunger 92, previously described as being associated with the discharge end of the baling machine, are so arranged that a supply of pressure fluid is delivered to cylinder 90 from the outlet of a pressure reducing valve 412 which has its inlet connected with pressure conduit 312. Reducing valve 412 is arranged similarly to reducing valve 384, and comprises a valve member 414 normally urged by spring 416 into position to establish unrestricted communication between the inlet and outlet of the said valve.

However, a pilot cylinder and plunger 418 is provided and is connected by pilot line 420 with the discharge side of the said valve, so that at a predetermined pressure at the outlet of the valve, the said valve member will be moved to restrict communication between the inlet and outlet, thereby to control the discharge pressure from the valve.

A check valve 422 is provided in the discharge line leading from the reducing valve and opening toward cylinder 90. Also on the discharge side of check valve 422 there may advantageously be arranged an accumulator 424. The outlet side of the check valve, cylinder 90, and the outlet side of the accumulator 424, are all connected together by conduit 426 leading through a pressure relief valve 428, to the reservoir 302. Relief valve 428 may advantageously be by-passed by a manually controlled valve 430 which may be opened to drain the cylinder and accumulator, if desired.

The described arrangement in connection with cylinder 90 is such that a predetermined minimum pressure will be built up in conduit 426 in order to urge plunger 92 outwardly with a predetermined thrust. A drop in pressure in supply conduit 312 does not affect this thrust because accumulator 424 will accumulate sufficient fluid to maintain the said pressure, and check valve 422 will prevent reverse movement of fluid from cylinder 90 through reducing valve 412.

At the same time, should plunger 92 be thrust into cylinder 90 by the action of the bale with a thrust exceeding that desired, then pressure relief valve 428 will operate to relieve the system of excessive fluid. At any time, of course, manually operated valve 430 may be opened in order to drain the system associated with plunger 92 of fluid, in order to permit adjustments to be made or for any other reason desired.

The pressure referred to necessary to operate valve member 342 is higher than the pressure necessary to operate the by-pass valve for the low pressure pump, and the arrangement thus provides for three speeds of operation of the baling head and a highly efficient use of the available hydraulic power.

Motor 136 has fluid supplied thereto from conduit 312 via reversing valve 343 which is urged by spring 345 toward position to retract the motor, and which may be shifted by energization of a solenoid S6.

*Electric control circuit*

Turning now to Figure 42, there is illustrated more or less diagrammatically, the electric control circuit by means of which the entire operation of the baling and tying mechanism is integrated. In this figure, the power lines are indicated at L1 and L2, and connected therebetween by a plurality of relays identified as R1, R2, R3, R4, R5, R6, R7, and R8. These relays control a plurality of operating solenoids, indicated at S1, S2, S3, S4, S5, and S6.

Also included in the circuit is limit switch LS1 which is controlled by the hopper gates; limit switch LS2, which is operated by the measuring wheel; limit switch LS3, which is operated by motor 136 when it is actuated for advancing the twister unit to its working position; limit switch LS4, which is operated by the wire feed ram in its fully advanced position; limit switch LS5, which is operated by tier ram 212 at the end of a tying operation; limit switch LS6, which is operated by the wire feed ram in its fully retracted position; limit switch LS7, which is actuated by the baling head when the baling head is in its advanced position; limit switch LS8, which is actuated by the baling head in its fully retracted position; limit switch LS9, which is operated by motor 136 when the twister unit is moved to its retracted position; and limit switch LS10 which is operated by the tier ram 212 when the tier unit is returned to its starting position.

Connected in circuit with the solenoid of relay R1 is limit switch LS1 through a normally closed blade of relay R4. When the switch is closed, indicating that the hopper gates are open and that, thus, there is an adequate supply of material in the chamber ahead of the baling head, relay R1 is energized. When relay R1 is energized, energy is conveyed through its blades a, b, and c to contact d of limit switch LS7, and through the blade of limit switch LS7 to contact e thereof, and then to the solenoid of relay R2, thereby energizing relay R2.

Energization of relay R2 will close its blades and energize solenoid S2, which pertains to valve 354 that controls the main valve that determines the operation of the baling head.

As soon as the baling head commences to retract, limit switch LS7 shifts to close on its contacts f and g, and, at this time, relay R2 is held energized through its upper blade and the blade of limit switch LS8. When the ram is fully retracted, it operates limit switch LS8 to close it on its contacts h and i, and this interrupts the energizing circuit to relay R2 allowing it to drop open and to de-energize solenoid S2.

This movement of limit switch LS8, when relay R2 is de-energized, will also bring about energization of relay R3, and through which solenoid S3 is energized, thereby shifting control valve 354 into its opposite end position and bringing about the reversal of the baling head.

When the baling head again reaches its advanced position, limit switch LS7 will return to the position indicated in the drawings, and at which time, if switch LS1 is open, the main control valve 334 for the baling head motor will center and unload the entire hydraulic system with the exception of conduit 312. If switch LS1, on the other hand, is closed, then, of course, a new cycle of operation of the baling head will obtain.

When sufficient material has been pushed past the measuring wheel 106, the said wheel will move rack 116 to the point where it will close limit switch LS2, and thereby energize relay R4. Energization of relay R4 will interrupt the energizing circuit to relay R1 and establish a circuit for the energization of relays R5 and R6. The establishment of a circuit to relays R5 and R6 will, of course, be made only when the baling head is in its fully advanced position, whereby to interrupt the holding circuit to relay R1.

When the circuit to relay R5 is established, it will be energized by current supplied thereto through the contacts j and k of limit switch LS6. When relay R5 closes, solenoid S4 is energized thereby, which causes operation of the wire feed mechanism. As soon as the wire feed ram commences to move, the limit switch LS6 will move to close on its contacts l and m, but, at this time, relay R5 will be held through its own holding circuit leading through limit switch LS5.

When the wire feed ram reaches its furthermost advanced position, thereby positioning the wire completely across the face of the baling head, limit switch LS4 will be closed, thereby supplying energizing current to solenoid S6, which will cause movement of the twister unit into operative position. When the twister unit reaches its working position, it closes limit switch LS3, and this energizes a relay R7 that in turn energizes S5.

When the twister unit leaves its retracted position it permits LS9 to close thus energizing relay R8. R8 establishes an energizing circuit for S4 and S6.

At the extreme end of the stroke of the ram 212 of the tier motor, and, therefore, at the conclusion of the tying operation, limit switch LS5 will be opened, and thereby de-energize relay R5, and which, in turn, will cause de-energization of R7. Re-energization of R7 will de-energize S5 to cause the tier motor to retract. At this time S4 and S6 remain energized on account of R8. When the tier motor is fully retracted, it opens limit switch LS10 which de-energizes solenoid S6 and permits retraction of the twister unit. When the twister unit is fully retracted it opens LS9 to de-energize R8 which will interrupt the circuit to S4.

When the wire feeding motor is fully retracted, limit switch LS6 will return to the position where it closes on contacts j and k. At this time, of course, relay R6 is de-energized, and this completes the wire tying cycle.

In connection with relay R6, it may be noted that it is energized upon energization of relay R5. When relay R6 is energized, it, in turn, energizes solenoid S1 which resets rack 116 associated with the measuring wheel so that the entire system will be reset when relay R6 becomes de-energized. In order to prevent relay R4 from dropping out when limit switch LS2 is opened by the resetting of rack 116, relay R6 also provides a holding circuit for relay R4.

When there is insufficient material in the hopper to supply the baling chamber, the baling head rests in its furthermost advanced position with the entire hydraulic circuit unloaded. Whenever the baling head is stopped in its advanced position by the operation of limit switch LS1 by the measuring wheel, the same conditions obtain.

Inasmuch as this completely unloads the hydraulic circuit, no power would normally be available for operating the wire feeding and wire tying mechanism. Also, the compression of the material in the baling chamber might force the baling head rearwardly, and, therefore, prevent the transverse slots 17 therein from aligning with the bars or needles 32 which push the wires across in front of the baling head preparatory to a tying cycle.

Accordingly, when relay R6 is energized, it also energizes solenoid S3, which shifts the valves associated with the baling head motor to the advancing position thereof, and this holds the baling head in its advanced position under pressure and also interrupts the by-pass through the control valve 334 so that pressure can be built up through the system for operating the tying, wire feeding, and twister advancing motors. This arrangement thus serves the dual purpose for correcting any misalignment between the slots in the plunger and the path of the wire pushing rods, and also conditions the hydraulic circuit so pressure is built up thereon.

From the foregoing, it will be evident that the present invention provides for a fully automatic baling machine characterized in that the baling head does not reciprocate unless there is sufficient material in the hopper to insure a full charge of material to the baling head, and that, whenever the bale reaches a predetermined size, it is automatically banded by a plurality of wires, and the wire automatically twisted and cut off and the raw edges thereof tucked into the corner of the bale.

Furthermore, due to the provision of the novel control means associated with the discharge end of the baling chamber, bales of uniform density are always produced substantially independently of the type of material being fed into the baling chamber.

A baler according to my invention, therefore, has wide application not only in industry as a stationary unit, but can be used in connection with baling farm produce and the like either as a mobile or a stationary unit.

Furthermore, the tying and twisting unit of the present invention is adapted for being associated with substantially conventional baling devices by mounting the tying and twisting units thereon.

The operation of the tier arrangement is integrated with the hydraulic and electric control systems so that, normally, once the baling machine is set into operation, it will continue to produce uniform and tightly banded bales so long as there is a supply of material thereto.

It will be understood that this invention is susceptible to modification in order to adapt it to different usages and conditions, and, accordingly, it is desired to comprehend such modifications within this invention as may fall within the scope of the appended claims.

I claim:

1. In a baling machine; a baling chamber, a hopper for supplying material to the chamber, a baling plunger reciprocable in the chamber to compact the material therein, a motor to drive said plunger in its opposite directions, means for controlling the energization of said motor including a relay, said relay having a first position wherein the motor is energized and a second position wherein the motor is de-energized, gates normally closing the bottom of the hopper, said gates being movable into open position in response to a predetermined weight of material thereon, and a switch positioned to be actuated by the gates in the open position thereof in circuit with said relay operable to prevent movement of said relay into its said first position when the gates are closed.

2. In a baling machine; a baling chamber, a hopper for supplying material to the chamber, a baling plunger reciprocable in the chamber to compact the material therein, a motor to drive said plunger in its opposite directions, means operated by the plunger at opposite ends of its stroke for reversing the energization of said motor, gate means normally closing said hopper responsive to a predetermined weight of material thereon for opening and supplying the material to the chamber, and means operated by said gate means in the open position thereof for energizing said motor.

3. In a baling machine having a baling chamber and a baling plunger reciprocable therein; banding mechanism comprising means at one side of the chamber for supporting a plurality of reels of wire, gripper means on the other side of the chamber for gripping the ends of the wires so the wires pass around three sides of a bale built up in the chamber, means for thrusting the wires leading from said reels completely across the chamber to enclose the fourth side of the bale and across the ends of the wires leading from said gripper means, means for severing the thrust across wires in the region of said gripper means and for gripping the ends of the strands leading to the reels while releasing the previously gripped ends, twister means operable to twist the ends of the strands passing around the bale together to form bands, said twister means being arranged to commence twisting of the wire before operation of the severing and gripping means, whereby the wires are taut when the twisting commences, and tucker means operable to strip the twisted ends from the twister means and thrust them into the corner of the bale.

4. In combination in a baling machine; banding mechanism including means to pass wire bands around a bale so the ends cross at one corner of the bale, slotted rods to engage the wires at their points of crossing and rotatable to twist the wires together, a sleeve on each rod having a finger projecting axially from the end thereof with a lateral notch located to engage the wires being twisted by the rod, means for reciprocating the sleeves on the rods toward the notched ends thereof, and means to rotate the sleeves so the said fingers will tuck the twisted portion of said wires into the bale under the wires.

5. In a banding mechanism for a baling machine having a baling chamber and a baling plunger reciprocable to compress material therein; a reel of wire on one side of said chamber and means on the other side of the chamber to grip the end of the wire so the wire will pass around three sides of a bale as it is formed, a bar on the said one side of the chamber reciprocable across the chamber and past the end of which bar the wire extending from the reel passes, means to actuate the bar so it thrusts the wire completely through the chamber, a twister member having a notch to engage the wire passing around the bale where the wire crosses while leaving free the other strand of wire that extends from the reel to the end of the bar, means for rotating said twister member to twist the wire together to form a band around the bale, means for severing the wire in the region of the end of said bar when the twister member is actuated for releasing the gripped end of the wire and for gripping the end of the wire leading to the said reel, a sleeve around the twister member having a projecting notched part positioned to engage the ends of the twisted together wire, and means for driving said member toward the corner of the bale after operation of the twister member to tuck the said ends into the corner of the bale.

6. In a banding mechanism for a baling machine having a baling chamber and a baling plunger reciprocable to compress material therein; a reel of wire on one side of said chamber and means on the other side of the chamber to grip the end of the wire so the wire will pass around three sides of a bale as it is formed, a bar on the said one side of the chamber reciprocable across the chamber and past the end of which bar the wire extending from the reel passes, means to actuate the bar so it thrusts the wire completely through the chamber, a twister member having a notch to engage the wire passing around the bale where the wire crosses while leaving free the other strand of wire that extends from the reel to the end of the bar, means for rotating said twister member to twist the wire together to form a band around the bale, means for severing the wire in the region of the end of said bar when the twister member is actuated for releasing the gripped end of the wire and for gripping the end of the wire leading to the said reel, a sleeve around the twister member having a projecting notched part positioned to engage the ends of the twisted together wire, and means for driving said member toward the corner of the bale after operation of the twister member to tuck the said ends into the corner of the bale, said member, sleeve, and means for severing and gripping the wire all being interconnected and commonly driven to provide for positive synchronization thereof.

7. In combination: a baling machine having a baling chamber and a baling plunger reciprocable therein, means supporting a reel of wire at one side of the chamber at the advanced position of the plunger, a frame on the other side of the chamber at the advanced position of said plunger, a twister rod rotatable in the frame directed angularly inwardly and downwardly toward the corner of the bale having a slotted end, a gripper and cut-off member rotatable on the frame on the axis of the rod having means to grip the wire and means to cut off the wire beyond the point of gripping thereof, a bar adjacent the reel having a roller over which the wire passes movable transversely to thrust the wire completely across said chamber past the end of said rod to the region of said gripping and cut-off member to cross over itself where held by said gripping means, the strand of wire at the back of the bale being in front of the end of the rod and the other strand leading to the reel being in back of the end of the rod, means operated by the movement of said bar to move said frame so the notched end of the rod engages the wire where it crosses over itself and extending from said member completely around the bale and then over the said roller and back across the chamber to said reel, means for rotating said rod and member in unison to cut off the wire passing across the back of the bale and to grip the end of the wire leading to the reel and to twist the free ends of the wire together, and means to tuck the twisted together ends of the wire into the corner of the bale.

8. In an automatic baler having a supply hopper, a baling plunger, and fluid operated banding mechanism, a fluid motor to drive the plunger, a source of pressure fluid, a control valve between the source and motor having two positions for opposite directions of movement of the plunger and a third position for by-passing said source to exhaust, means responsive to a predetermined minimum supply of material in the hopper for moving the valve to its third position when the plunger is advanced, and means responsive to the building up of a bale of predetermined size for preventing movement of the valve away from its plunger advancing position at the end of an advancing stroke of the plunger to maintain pressure at the source to operate the banding mechanism.

9. In a baling machine; a baling chamber open at the top and having a motor driven baling plunger reciprocable therein, a hopper on top of the chamber having gates at the lower ends of its side walls pivoted along their upper edges to swing inwardly to a horizontal position to close the hopper, said gates being connected to swing together between horizontal and vertical positions, counterweight means on the gates to hold them in hopper closing position until a predetermined weight of material is resting thereon, and switch means controlled by said gates operable for deenergizing of said motor when the gates are in hopper closed position, and for energizing said motor when the gates are in hopper open position.

10. In a baling machine; a baling chamber open at the top and having a motor driven baling plunger reciprocable therein, a hopper on top of the chamber having gates at the lower ends of its side walls pivoted along their upper edges to swing inwardly to a horizontal position to close the hopper, said gates being connected to swing together between horizontal and vertical positions, counterweight means on the gates to hold them in their vertical or hopper closing position until a predetermined weight of material is resting thereon, and switch means controlled by said gates for establishing an energizing circuit for said motor only when the gates are in hopper open position, said counterweight means comprising portions that move over center when the gates move to their vertical position to assist in holding the gates open.

References Cited in the file of this patent

UNITED STATES PATENTS

| | | |
|---|---|---|
| 792,935 | Sikes | June 20, 1905 |
| 963,180 | Robben | July 5, 1910 |
| 994,661 | Schubert | June 6, 1911 |
| 1,094,627 | Bancroft et al. | Apr. 28, 1914 |
| 1,855,434 | Vickers | Apr. 26, 1932 |
| 2,055,831 | Wilhelm | Sept. 29, 1936 |
| 2,167,633 | Holbrook et al. | Aug. 1, 1939 |
| 2,367,180 | Belt | Jan. 16, 1945 |
| 2,403,396 | Raney | July 2, 1946 |
| 2,411,467 | Russell | Nov. 19, 1946 |
| 2,456,476 | West et al. | Dec. 14, 1948 |
| 2,492,228 | Lee et al. | Dec. 27, 1949 |
| 2,520,800 | Fraser | Aug. 29, 1950 |
| 2,546,324 | Tuft et al. | Mar. 27, 1951 |
| 2,551,873 | Burford | May 8, 1951 |
| 2,560,143 | Vietti | July 10, 1951 |
| 2,609,698 | Patzer | Sept. 9, 1952 |
| 2,610,573 | Altgelt | Sept. 16, 1952 |
| 2,644,283 | Rogers et al. | July 7, 1953 |
| 2,646,745 | Seltzer | July 28, 1953 |
| 2,674,181 | Jones | Apr. 6, 1954 |